United States Patent Office 3,091,553
Patented May 28, 1963

3,091,553
PROCESS FOR THE PRODUCTION OF A MOISTURE-PERMEABLE FILM OF PLASTIC MATERIALS
Tsunetaka Matsumoto, Ikutaku, Kobe, and Norio Kato and Keizo Sumitani, Kanaiwa, Kanazawa, Japan, assignors to Sanzen Seishi Kabushiki Kaisha, Kanaiwa, Kanazawa, Japan
No Drawing. Filed Nov. 20, 1961, Ser. No. 153,705
Claims priority, application Japan Nov. 25, 1960
13 Claims. (Cl. 117—138.8)

This invention relates to a process for the production of a highly ventilative and moisture-permeable film of plastic materials. To increase the moisture-permeability of a film, there may be generally employed a process of making the film porous and a process of incorporating a hygroscopic or wettable substance in the film.

As the process of producing a porous article of plastic materials there have been publicly known various methods; a method of using a so-called foaming agent, a method of removing out a soluble material from the film, a method of employing a pressured gas, and so on. These methods are applied in many ways according to the nature of the raw material and the purposes of the products required. However, it is usual that these known methods have been exclusively applied to the articles of a considerable thickness.

In practice, they are difficult to be applied to a thin film. For example, with the method of making an article porous by removing out a soluble substance dissolved in the film therefrom, it is difficult to prepare a film which contains a large amount of the soluble substance sufficient to insure the formation of the pores. It is further difficult to produce a porous and uniform film even if any foaming agent is used. On other hand, with the process of incorporating a hygroscopic substance in the film, it is difficult to incorporate a large amount of such a substance sufficient to insure the formation of the pores. Even if a large amount of the hygroscopic substance may be incorporated in the material by the roll process, it is not successful to produce a highly moisture-permeable film because the grains of the hygroscopic substance introduced are surrounded by the high molecular material of the film and the grains are present separately from each other.

According to a feature of the present invention there is provided a process for the production of a moisture-permeable film of plastic materials, characterized in that a solvent for the plastic material of which viscosity and surface tension have been adjusted is uniformly applied in the form of fine particles onto the surface of the film, and the film with the solvent particles is then heated to thereby dissolve the plastic material in the portions of the film to which the solvent particles are adhering, so that the moisture-permeability of the film is increased. According to another feature of the invention there is further provided a process for the production of a moisture-permeable film of plastic materials, characterized in that a dispersion of the solvent for the plastic material in which a fine powder of an inorganic or organic substance insoluble in the solvent has been dispersed instead of the adjusting agent of viscosity and surface tension of the solvent is uniformly applied in the form of fine particles onto the surface of the film, and subsequently the similar operation is then performed as stated in the above.

An object of the invention is to produce a highly ventilative and moisture-permeable film of plastic materials which is suitable for use in agricultural and other applications, while the decrease in strength of the film is suppressed as less as possible.

In the present invention, the "film of plastic material" means any film made of polyethylene, polyvinyl chloride, polyvinyl chloride copolymer, nylon, polypropylene, polystyrene and copolymers thereof which shows a softening point and be soluble in solvents. The thickness of the film used may be of the films of from 0.01 to 0.1 mm. thick which usually may be produced by various conventional methods, but it is properly variable depending on the selection of solvent and the quantity of the solvent particles applied onto the film surface. Thus, the thickness of the film is not limited to the above specified range.

In the invention there may be used various solvents for the film of plastic materials; in the case of a polyethylene film, for example, tetralin, decalin, trichloroethylene, tetrachloroethylene, carbon tetrachloride, xylene, chlorobenzene, fluid paraffin may be used, which do not dissolve the film at normal temperature but can dissolve the latter at elevated temperature; in the case of a polypropylene film, tetrachloroethylene, monochlorbenzene, decalin, tetralin, etc. may be used; in the case of a polyvinyl chloride film, cyclohexane, methyl cyclohexanone, dimethyl formamide, nitrobenzene, tetrahydrofuran, etc. may be used; in the case of a polystyrene film, toluene, xylene, benzene, carbon tetrachloride, etc. may be used, and in the case of a nylon film, formic acid, phenol, meta-cresol, etc. may be used.

While, a solvent usually has a definite solubility for a specific plastic material and hence the formation of the pores in the film becomes more difficult as the thickness of the film is increased with a constant size of the solvent particles. Accordingly it is necessary to increase the size of the solvent particle adhering onto the film surface, to prevent the solvent particles from spreading over the film surface and to increase the angle of contact between the solvent particle and the film surface, if the film is much thicker.

A solvent shows a definite viscosity and surface tension at every temperature. When a particle of a solvent is dropped onto e.g. a polyethylene film, the angle of contact between them is constant owing to a definite affinity of the solvent to the polyethylene. For example, when a particle of kerosene is dropped onto a polyethylene film, the kerosene spreads over the surface of the film due to its high spreading factor and the contact angle of approximately zero.

With tetralin, however, it may adhere in the form of a particle onto the film because it has a low spreading factor and the contact angle is larger than that of kerosene. Thus, it may be sometimes necessary to enhance the cohesion of a solvent with aid of an additive which will reduce the wetting of the film, in other words increase the contact angle of the solvent, or increase an apparent contact angle. Therefore the viscosity and/or surface tension of all of the above-mentioned solvents should be adjusted so as to make proper the contact angle between the solvent and the film, and the dissolving speed of the solvent should be increased by heating to an elevated temperature.

In general, the cohesion of a liquid increases as the surface tension of the liquid is enhanced, and the cohesion of a liquid increases, too, as the viscosity of the liquid is enhanced. For the purpose of adjusting the contact angle or apparent contact angle it is thus possible to add into a solvent a proper surface-tension adjusting agent selected from the substances which show a high surface tension, such as bromobenzene, α-bromonaphthalene, glycerin, ethylene glycol, formic amide, aniline, nitrobenzene, benzaldehyde and the like, or alternatively a proper viscosity-adjusting agent selected from the substances which show a high viscosity, such as castor oil, polyvinyl alcohol, nature rubber, polystyrene, polyvinyl chloride, polyvinyl acetate and the like. To this end, it is also possible to add into the solvent a substance such as fluid paraffin which also shows itself dissolving power for the plastic film used. Accordingly it needs to select a suitable type of solvent and adjust the viscosity and surface tension of the solvent in accordance with the thickness of the film used. Since, however, the magnitude of the contact angle does not go beyond a limit, it is necessary to increase the size of the solvent particle when the film is much thicker. The size of the solvent particle and the size of the formed port are regulated by the thickness of the film.

In case the pores cannot be formed even by blowing a jet of steam onto the film with the solvent particles adhering onto one side thereof, it is preferred to increase the size of the solvent particle and, in addition thereto, to either apply the solvent particles onto both the sides of the film, or to apply a layer of the solvent over one side of the film and apply the solvent particles onto the other side of the film, followed by blowing the film with a jet of steam, so that the pores are formed. In this way, the thickness of the film is allowed to be increased. When the film and solvent are heated by means of a jet of steam to insure that the solvent dissolves the plastic material of the film, the treated film shows different appearances independent of the manner of blowing the steam onto the film. That is, when the steam is blown onto the side of the film to which the solvent particles are adhering, the surface of the film becomes cloudy, but when the steam is blown onto the back side of the film, the surface of the film does not become cloudy. This formation of cloudness is due to that an amount of water is forced to break into the solvent particles under the pressure of the steam and it penetrates into the film when the latter is dissolved by the solvent. This phenomenon may be utilized to control the transparency of the film. In the process of the invention, the formation of the pores is owing to that the solvent dissolves the plastic material of the film, and the dissolved fluid part of the plastic material is collected around the pores and thus increases the thickness of the peripheral portions of the pores, so that the reduction in the strength of the film is prevented as less as possible. When the solvent particles containing a fluid paraffin and a surface-active agent as the additives are applied onto a film and the film is then blown with steam, the surface-active agent can penetrate into the film, so that the moisture-permeability of the film may be improved even if any pore is not formed in the film. The film produced in this manner shows that the surface-active agent passes across the cross-section of the film in the form of strings, while a film produced by admixing the plastic material with the surface-active agent by means of rolls shows that the surface-active agent is present in the form of grains in the interior of the film. Therefore, the film produced in the above-mentioned manner according to the invention shows a better permeability to water than the film produced by the roll process.

As a fine powder of an inorganic substance which may be possibly dispersed in the solvent, talc, zinc oxide, acid clay, diatomaceous earth, magnesia, aluminum and the like are used. As a fine powder of an organic substance, there may be used cellulose, carboxymethyl cellulose, polyvinyl alcohol and the like. The average particle size of the fine powder of the inorganic substance may be suitably of 5 microns. However, it is preferred that the average particle size of the fine powder of the organic substance is somewhat lower than that of the fine powder of the inorganic substance.

In case such a fine powder of an organic or inorganic substance is added to and dispersed in the solvent, it is not necessary to adjust the viscosity and surface tension of the solvent, and it is possible to reduce the diameter of the pore and improve the appearance of the film as described below, when a fluid paraffin, for example, is used as the solvent for forming the pores in the film of a plastic material and this solvent contains talc powder as the additive, many spaces are formed along the talc particles since the crystal of talc is angular. When these talc particles accumulate, the volume of the spaces is increased in which the fluid paraffin exists. Owing to this, therefore, the solvent is prevented from spreading over the film surface and consequently the quantity of the solvent fed per unit of area of the film surface increases, so that the diameter of the pore formed is decreased. Further, a part of the talc may be allowed to break into the film together with the solvent. On the other hand, when an additive having the adsorption ability or porous character, such as acid clay or diatomaceous earth is added to and dispersed in the solvent such as fluid paraffin or tetralin, the solvent may be adsorbed into the interior of the additive. Accordingly, the quantity of the solvent fed per unit of area the film surface may be larger than in the case of using the talc, so that the diameter of the pore formed can be then much decreased when the pores are formed in the film while heating at an elevated temperature.

Furthermore, a peculiar appearance may be imparted to the surface of the film when an additive to be mixed with the solvent is dyed with various coloring matters or when a coloring additive is used in the solvent for the formation of the pores.

When an additive such as a fine powder of polyvinyl alcohol or cellulose is employed, it is further noted that such additive serves not only to prevent the spreading of the liquid particles adhering onto the film but also to increase the moisture-permeability of the film, because said additive itself is polar. In accordance with the invention, a moisture-permeable film of a plastic material which shows a moisture-permeability of 20–3000 grams of water per square metre per 24 hours can be produced by controlling the sprayed amount and adhering quantity of the solvent, the size and contact angle of the liquid particle as well as the kind and quantity of the additive used.

In the invention, a spray gun may be employed to apply the solvent uniformly onto the surface of the film in the form of the fine particles. Alternatively, any printing method such as the off-set process and the gravure-printing process, etc. may be suitably employed. Moreover, proper medium such as steam, hot air and the like may be used as the means of heating the film and solvent.

The invention is now illustrated with reference to examples.

*Example 1*

A solvent comprising a solution of 5 parts of bromobenzene in 100 parts of tetralin is prepared for use in the formation of the pores in a film of a high pressure polyethylene of 0.03 mm. thick.

This solvent is placed in a sprayer and sprayed through a nozzle to apply 10 g. of the solvent per square metre of the surface of the film. The film surface is then immediately blown on one side with steam. In this way, a film having fine uniform pores is obtained. This product has a gas-permeability higher than the untreated film and shows a moisture-permeability of 450–500 g. of water per m.$^2$ for 24 hours.

Example 2

A polyethylene film of 0.02 mm. thick is similarly treated as described in Example 1 with a solvent comprising a solution of 25 parts of a fluid paraffin in 100 parts of tetralin, the sprayed amount of the solvent being 6 g./m.$^2$. A uniformly porous film is obtained.

Example 3

A polyethylene film of 0.05 mm. thick is similarly treated as described in Example 1 with a solvent comprising a solution of 10 parts of a fluid paraffin and 10 parts of a surface active agent in 100 parts of tetralin, the sprayed amount of the solvent being 17 g./m.$^2$. A porous film is obtained.

Example 4

A film of a polyvinyl chloride of 0.03 mm. thick is treated with a solvent comprising a solution of 20 parts of a fluid paraffin in 100 parts of cyclohexanone, the sprayed amount of the solvent being 15 g./m.$^2$. The sprayed film is heated at 160° C. to perform the dissolution of the polymer. There is obtained a porous film which is similar to the polyethylene films produced in the preceding examples.

Example 5

A film of a polypropylene of 0.02 mm. thick is treated with a solvent comprising a solution of 30 parts of a fluid paraffin in 100 parts of decalin and 50 parts of tetralin, the sprayed amount of the solvent being 9 g./m.$^2$. The sprayed film is heated at 160° C. to perform the dissolution of the polymer. There is also obtained a porous film which is similar to the polyethylene films produced in the preceding examples.

Example 6

A dispersion of 50 parts of a talc powder having an average particle size of 5µ suspended in 100 parts of a fluid paraffin is prepared for use in the formation of the pores in a film of a high pressure polyethylene of 0.03 mm. thick. This dispersion is uniformly applied onto the surface of the film by the gravure-printing method in the proportion of 14 g. of the dispersion per square metre of the film surface. The film is then brought into contact with a heated roll of which the surface temperature is adjusted to 80–85° C. In this way, a film having the fine uniform pores is obtained.

Example 7

A dispersion of 8 parts of cellulose powder suspended in 100 parts of tetralin is prepared for use in the formation of the pores in a film of a high pressure polyethylene of 0.02 mm. thick. This dispersion is sprayed in the form of aerosol to apply 8 g. of the dispersion per square metre of the film surface, and the surface of the film is then immediately blown upon with steam. A uniformly porous film is obtained.

Example 8

A polyethylene film of 0.02 mm. thick is treated with a dispersion of 25 parts of aluminum powder in 100 parts of a fluid paraffin and 50 parts of decalin in a similar way as described in Example 7, the sprayed amount of the dispersion being 8 g./m.$^2$. A porous film was obtained.

Example 9

A polyvinyl chloride film of 0.03 mm. thick is sprayed with a dispersion of 30 parts of an acid clay powder in 100 parts of cyclohexane, the sprayed amount of the dispersion being 16 g./m.$^2$. The sprayed film is then heated to 160° C. to perform the dissolution of the polymer. A uniformly porous film is obtained.

Example 10

A polypropylene film of 0.02 mm. thick is sprayed with a dispersion of 20 parts of magnesia in 100 parts of decalin, the sprayed amount of the dispersion being 10 g./m.$^2$. The sprayed film is then heated to 160° C. to perform the dissolution of the polymer.

The moisture-permeable film of the plastic material produced by the invention has remarkable advantages when used in agricultural, medical, packing and clothing applications, etc.

What we claim is:

1. A process for the production of a moisture-permeable film of a plastic material which comprises:
    (a) uniformly and discontinuously adhering to the surface of a film of plastic material fine particles of a solvent for the plastic material, the viscosity and the surface tension of the solvent being adjusted to effect said uniform and discontinuous adhesion; and
    (b) heating the film with the solvent particles adhered thereto, thereby to effect dissolution of the plastic material at the loci on the film where said particles are adhered with resultant increase in the moisture-permeability of the film.

2. A process as defined in claim 1, wherein the adjustment of the surface tension is effected by a member selected from the group consisting of chlorobenzene, bromobenzene, α-bromonaphthalene, glycerin, ethylene glycol, formamide, aniline, nitrobenzene and benzaldehyde.

3. A process as defined in claim 1, wherein the adjustment of the viscosity is effected by a member selected from the group consisting of fluid paraffin, castor oil, polyvinyl alcohol, natural rubber, polystyrene, polyvinyl chloride and polyvinyl acetate.

4. A process for the production of a moisture-permeable film of a plastic material which comprises:
    (a) applying uniformly to the surface of a film of plastic material fine particles of a dispersion of a solvent for the plastic material in which a fine powder of an inorganic substance, insoluble in the solvent, is dispersed; and
    (b) heating the film with the applied particles, thereby to effect dissolution of the plastic material at the loci on the film where said particles are adhered with resultant increase of the moisture-permeability of the film.

5. A process as defined in claim 4, wherein the inorganic substance is a member selected from the group consisting of talc, zinc oxide, acid clay, diatomaceous earth, magnesia and aluminum.

6. A process for the production of a moisture-permeable film of a plastic material which comprises:
    (a) uniformly and discontinuously adhering to the surface of a film of plastic material fine particles of a dispersion of a solvent for the plastic material in which a fine powder of an organic substance, insoluble in the solvent, is dispersed; and
    (b) heating the film with the particles adhered thereto, thereby to effect dissolution of the plastic material at the loci on the film where said particles are adhered with resultant increase in the moisture-permeability of the film.

7. A process as defined in claim 6, wherein the organic substance is a member selected from the group consisting of carboxymethyl cellulose and polyvinyl alcohol.

8. A process as defined in claim 1, wherein the plastic material is a member selected from the group consisting of polyethylene, polyvinyl chloride, polyvinyl chloride copolymer, nylon, polypropylene, polystyrene and copolymers thereof.

9. A process as defined in claim 4, wherein the plastic material is a member selected from the group consisting of polyethylene, polyvinyl chloride, polyvinyl chloride copolymer, nylon, polypropylene, polystyrene and copolymers thereof.

10. A process as defined in claim 6, wherein the plastic material is a member selected from the group consisting of polyethylene, polyvinyl chloride, polyvinyl chloride copolymer, nylon, polypropylene, polystyrene and copolymers thereof.

11. A process as defined in claim 1, wherein the solvent is a member selected from the group consisting of tetralin, decalin, trichloroethylene, tetrachloroethylene, carbon tetrachloride, xylene, chlorobenzene, fluid paraffin, cyclohexanone, methyl cyclohexanone, dimethyl formamide, nitrobenzene, tetrahydrofuran, toluene, formic acid, phenol and metacresol.

12. A process as defined in claim 4, wherein the solvent is a member selected from the group consisting of tetralin, decalin, trichloroethylene, tetrachloroethylene, carbon tetrachloride, xylene, chlorobenzene, fluid paraffin, cyclohexanone, methyl cyclohexanone, dimethyl formamide, nitrobenzene, tetrahydrofuran, toluene, formic acid, phenol and metacresol.

13. A process as defined in claim 6, wherein the solvent is a member selected from the group consisting of tetralin, decalin, trichloroethylene, tetrachloroethylene, carbon tetrachloride, xylene, chlorobenzene, fluid paraffin, cyclohexanone, methyl cyclohexanone, dimethyl formamide, nitrobenzene, tetrahydrofuran, toluene, formic acid, phenol and metacresol.

References Cited in the file of this patent

UNITED STATES PATENTS

| | | |
|---|---|---|
| 2,806,256 | Smith-Johannsen | Sept. 17, 1957 |
| 2,826,509 | Sarbach | Mar. 11, 1958 |